Dec. 9, 1969  G. TRAUTZSCH ETAL  3,482,806
AIRCRAFT LANDING GEAR WHEEL
Filed Jan. 5, 1968
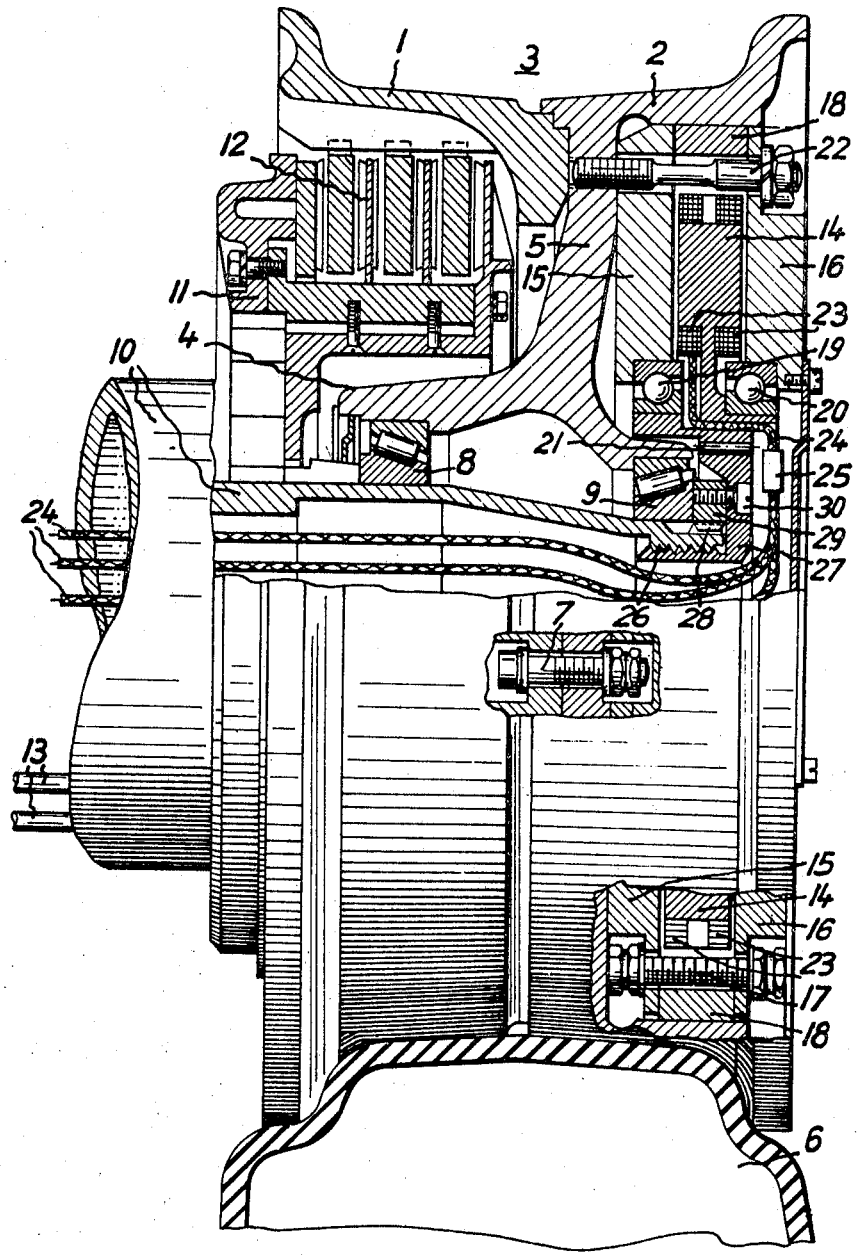
Inventors.
Gottfried Trautzsch
Kurt Brüggen
BY Spencer & Kaye
ATTORNEYS.

United States Patent Office 3,482,806
Patented Dec. 9, 1969

3,482,806
AIRCRAFT LANDING GEAR WHEEL
Gottfried Trautzsch, Hamburg, and Kurt Bruggen, Wedel, Holstein, Germany, assignors to Licentia Patent-Verwaltungs-G.m.b.H., Frankfurt am Main, Germany
Filed Jan. 5, 1968, Ser. No. 695,985
Claims priority, application Germany, Jan. 5, 1967, L 55,438
Int. Cl. B64c 25/40
U.S. Cl. 244—103                             8 Claims

ABSTRACT OF THE DISCLOSURE

An aircraft landing gear wheel arrangement which has an electric motor for driving the wheel while the aircraft is in the air prior to landing. The wheel arrangement has on an axle a wheel incorporating a hub rotatably mounted on the axle, a rim and a generally radially extending felly connecting the hub to the rim; and an electric motor attached to the axle and to the wheel for driving the wheel. The motor includes at least one rotor disc secured to the wheel and a stator disc spaced axially from the rotor disc or discs. The stator disc is supported both in its axial and radial directions solely by securing means interposed between the rotor and the stator. The stator disc is prevented from rotating with the rotor by securing means interposed between the stator and the axle which provide exclusively a positive rotational coupling between the stator disc and the axle. The electric motor is arranged inside the landing gear wheel such that the wheel felly constitutes an end wall and a portion of the wheel rim constitutes a cylindrical portion of the housing of the motor.

Background of the invention

The present invention relates to an aircraft landing gear wheel, and in particular to a wheel which is brought up to a rotational speed which corresponds to the aircraft landing speed while the aircraft is still in the air.

Airplane landing gear normally includes a stationary pin axle and a wheel having a wheel hub rotatably mounted on the axle, a rim and an approximately radially extending felly which joins the rim and the hub together. A braking mechanism, which usually includes a hydraulic disc-type brake, is provided inside of the rim on one side of the felly. The elasticity or flexibility of the landing gear wheel is improved if the felly is arranged to run somewhat obliquely instead of directly radially away from the axle.

When an aircraft employing this type of landing gear touches down on a runway, the initially stationary landing gear wheels quickly accelerate to a circumferential speed which corresponds to the landing speed of the aircraft. This sudden acceleration places stresses on the landing wheel tire which, at the very least, increases the rate of wear and, in the least favorable case, can cause the destruction of the tire. This danger of destruction is increased still further as the runways are paved with surfaces of ever-increasing roughness in an effort to shorten the braking distance of the aircraft. The sudden acceleration of the landing gear wheels also produces an increased shock load on the landing gear which, in turn, is transmitted to the aircraft itself.

These disadvantages and dangers could be avoided if the landing gear wheels were brought up to a suitable rotational speed by means of a drive mechanism before the aircraft lands on the runway. A positive wheel drive which can serve this purpose is not known in the art, however, because there is but a very limited space available in the landing gear wheel in which such a drive can be accommodated.

The employment of electric motors having a cylindrical construction as landing gear wheel drives is out of the question since not only are these motors large, but also heavy in comparison to the power they produce. Although axial air gap electrical machines do have a more favorable power-to-weight ratio, there is an obstacle to their use in direct physical connection with an aircraft wheel which far outweighs the disadvantages of size of the conventional electrical machinery; namely, their sensitivity to changes in the width of their axial air gaps. This sensitivity results basically from the fact that the magnetic induction in these machines changes approximately as a function of the square of the airgap width.

Displacement invariably occurs in an aircraft wheel between the rim, on the one hand, and the hub or the pin axle, on the other. It is clear, in the first place, that the landing gear wheel will be elastically deformed when the aircraft touches down on the runway. This actually desirable spring action is promoted if the felly is inclined somewhat with respect to the radial direction of the wheel as mentioned above. When the aircraft wheel touches the runway, there is a distortion of wheel rim about its hub, a distortion which occurs to an especially high degree when, in a crosswind, the aircraft must land at an angle to the runway.

A second cause of shifting between the rim and the axle can lie in the axial displacement of the wheel on the supporting wheel bearings. These bearings which lie between the pin axle and the hub are usually tapered roller bearings which, for example, can exhibit a taper ratio of 1:10. As a result, the small amount of play which normally develops between the bearings and their races during their service life will allow ten times that amount of axial displacement of the wheel with respect to the axle.

A final cause of shifting within the aircraft wheel results from the heat obtained from the kinetic energy of the aircraft when the braking mechanism is activated. This heat causes various parts of the aircraft wheel, which receive different amounts of heat, to expand in varying degrees. As a result, parts of the rim may be made to shift axially with respect to the hub of the wheel.

All of these changes in positions would have their effect upon a rotor-stator air gap if a conventional electric axial air gap machine were constructionally coupled with the aircraft landing gear wheel. It is possible too that the air gap width would be further unfavorably reduced as the result of the increase in temperature of the electromagnetic active members of the electrical machine during its operation. If all of the deformations and displacements mentioned above be added together, there is a possibility not only that the electromagnetic behavior of the electrical machine would change, but also that the rotor and stator of the machine would come in contact with each other. This latter event could cause the stator and rotor and, thus, the entire landing gear wheel to lock and result in a severe aircraft accident.

Summary of the invention

An object of the present invention, therefore, is to design an aircraft landing gear wheel which can be brought up to a suitable rotational speed before the aircraft lands on a runway, yet which will overcome the difficulties and dangers set forth above.

This, as well as other objects which will become apparent in the discussion that follows, are achieved, according to the present invention, by providing the landing gear wheel, inside of its rim on the side of the felly which is not occupied by the braking mechanism, with a disc-type rotating electric machine, which includes a stator disc, a rotor consisting of at least one rotor disc, and a machine housing having an end wall and a circumferential wall, the end wall being constituted by the felly and the circumferential wall by a cylindrical portion of the rim of the wheel. The stator disc of the machine is entirely supported in its axial and radial direction by a first securing means interposed between the rotor of the machine and the stator disc, and is coupled to the pin axle by a form-locking connection which is effective only in the direction of rotation of the wheel.

This construction of the landing gear wheels according to the present invention makes it possible, on one hand, to dispense with any special housing parts for the inserted electric drive motor, and, on the other, simultaneously solves the problems of an electric motor set forth in the introduction above. The stator disc and the rotor of the electric motor form a ring-shaped unit of construction which is in itself warp-resistant yet radially and axially moveable with respect to the fixed axle and the hub of the wheel. The motor parts which are supported one on the other also retain their fixed position with respect to each other even during eventual elastic distortions of the landing gear wheel, so that, in particular, the axial air gap will remain substantially constant.

One simple, advantageous construction of the form-locking securing means between the stator disc of the electric motor and the stationary axle of the landing gear wheel, according to the present invention, is provided by a connecting plate or disc which has teeth around its outer circumference which engage corresponding recesses in the stator as well as means to rigidly mount it to the free end of the axle. The use of such a connecting plate makes it possible, according to a further feature of the present invention, to shield the wheel bearing which lies at the free end of the axle from outside atmospheric or mechanical influences by allowing the connecting plate to cover the support bearing like a bearing cap.

Finally, according to a further embodiment of the invention, a means is provided which not only produces the form-locking connection between the axle and the stator disc and serves to protect the bearing arranged at the free end of the axle, but also permits the necessary adjustment of the play in the wheel bearings. This is accomplished by providing the free end of the axle, which is hollow, with an internal screw thread and the external circumference of this end of the axle with a spline. The connecting plate is constructed with a matching screw thread so that it screws into the internal thread of the axle. A clamping or locking ring, provided with internal teeth corresponding to the external spline of the axle, is arranged around the free end of the axle so that it is free to move in the axial direction and transmit the axial adjustment of the connecting plate to the wheel bearings. The connecting plate is designed to be detachably coupled to the locking ring.

The disc-type electric machine in the aircraft landing gear wheel according to the present invention may be provided either with a single or with two rotor discs. In the case of the single rotor disc machine, it is possible to employ means well known in the art which prevent the axial separation of the stator and the rotor disc.

When a disc-type single rotor disc machine is operated electromagnetic attraction forces occurring between the stator and rotor place a load upon the bearing which supports the stator disc from the rotor disc. If, on the other hand, two rotor discs are employed with a stator disc arranged between them, the electromagnetic forces and, in turn, the load on the motor bearings in question are somewhat reduced. A further advantage of employing two rotor discs instead of one on such a machine is that the motor power-to-weight ratio is increased.

A particular feature of the present invention is, therefore, that the electric motor includes two rotor discs with a stator disc arranged between them, that the felly supports the electromagnetically active member of one rotor disc and that the stator disc is braced vis-a-vis the rotor discs by means of ball bearings.

To equalize any possible changes in the width of the stator, the second, outside rotor disc may, in accord with a further embodiment of the present invention, be mounted so as to be able to yield in the axial direction.

To insure that the landing gear wheels of an aircraft run in synchronism when the brakes are applied, it is common practice to provide each wheel—for example, inside the hollow axle—with a small electric generator: the so-called "anti-skid generator." The voltage level or the frequencies of the signals produced by these generators are used as a measure of the rotational speeds of the landing gear wheels. These electrical values, either voltage or frequency, are compared; if differences occur, the braking force to the slower wheel can be reduced. This arrangement prevents a possible feathering of the airplane and, in the worst case, prevents a brake or brakes from locking.

One of the advantages of the electric drive according to the present invention is that, after the motor power has been switched off, the electrical machine can be used as an anti-skid generator during the braking process on the runway.

Brief description of the drawing

The drawing is an elevational, partly cross-sectional, partly simplified view of an aircraft landing gear wheel, according to a preferred embodiment of the present invention.

Description of the preferred embodiment

Referring now to the drawing, there is shown an aircraft landing gear wheel of the conventional type having a rim 3, consisting of two rim portions 1 and 2, a hub 4, a felly 5, as well as a tire 6 mounted on the rim 3. The two portions 1 and 2 of the rim are joined at the outer circumference of the felly 5 by means of a number of bolts 7. The hub 4 is rotatably mounted and also held in the axial direction on the pin axle 10 by means of the tapered roller bearings 8 and 9. The axle 10 is fixed on its left side to the remainder of the landing gear of the aircraft, not shown. In the region to the left of the felly of the wheel the axle is extended into a flange 11 which serves to receive the braking forces transmitted from the hydraulic braking mechanism 12. Hydraulic brake lines 13 are provided in the axle 10 for the actuation of the braking mechanism 12.

Inside of the member 2 of the rim of the wheel is a disc-type electric motor consisting of a stator 14 and a rotor having two rotor discs 15 and 16. The housing, which encloses this electric motor, is largely formed from the felly 5 and the member 2 of the rim. The two rotor discs are held together by a number of bolts 17 distributed around their circumference. Non-magnetic yoke members 18 insure that the distance between the rotor discs 15 and 16 remains constant or even exhibits a desirable increase when the members 18 expand with increasing temperature.

The stator 14 is supported in an axial and radial direction exclusively by the rotor of the electric motor, that is, the two rotor discs 15 and 16. This is accomplished by means of the shoulder ball bearings 19 and 20. As a result, the stator follows all the movements of the rotor and remains exactly centered between the rotor discs 15 and 16. The stationary axle 10 is allowed to transmit forces to the stator 14 solely in the rotational or circumferential direction. This is accomplished by means of spline 21 internal to the stator which will be described in detail below.

Instead of rigidly connecting the rotor discs 15 and 16 together by means of the bolts 17, the rotor disc 16 can, according to a particular feature of the present invention, be flexibly attached to the rotor disc 15 by means of springs replacing the bolts 17, or by means of yieldable clamps fastened to member 2 of the rim, or in still another way 34 omitting bolts 17 and choosing highly elastic fastening means for fastening both rotor discs 15, 16 to felly 5, such as necked-down fastening bolts 22. This gives the advantage that the rotor disc 16 can yield with any possible axial—e.g., heat—expansion of the stator between the bearings 19 and 20. If this is done, however, it is necessary to accept the disadvantage that the magnetic attraction forces which the stator 14 exerts on the rotor discs 15 and 16 will then be absorbed by the bearings 19 and 20. In any case, it is practical to construct the bearings 19 and 20 as axial ball bearings which can withstand axial as well as radial forces.

All the electromagnetically active members of the electric motor, in particular the stator 14 and the rotor discs 15 and 16, form a unitary construction which is mounted to the felly 5 inside the rim member 2 solely by means of the necked-down expansion bolts 22. This type of arrangement makes it possible, first of all, to easily assemble and disassemble, to exchange and to adjust the electric motor without taking off the aircraft landing gear wheel. This arrangement, secondly, makes the support bearing 9 accessible to assembly and disassembly and makes both bearings 8, 9 susceptible to a play adjustment independently of the built-in electric motor. Finally, the construction described above exhibits the important advantage of making the unit of construction, that is the electric motor, especially rigid and warp-resistant.

Since the electrical construction of a disc-type electric motor is well known in the art, this, for reasons of clarity, has not been indicated in detail in the figure. The machine can, for example, be constructed as a non-synchronous motor having the indicated three phase windings on the stator 14 and their corresponding spoke wheel-like copper squirrel cages inserted in the rotor discs 15, 16 on the sides of these discs which face the stator 14. The power input leads 24 of the stator windings 23 may be led inward in any appropriate fashion to the center of the landing gear wheel, then passed through the hollow axle 10 to a suitable source of power. To make assembly and disassembly easier, plug-in connections 25 are provided in a readily accessible position.

A connecting plate 27 is screwed into an internal thread 26 in the free end of the axle 10. A locking ring 29 is held axially displaceable with respect to the axle 10 by means of an external spline 28. The connecting plate 27 and the locking ring 29 have the threefold purpose of transferring torsional forces from the stator 14 to the axle 10, adjusting the play in the axle bearings 8 and 9, and providing a cover to protect the bearing 9.

The connecting plate 27 is provided at its outer circumference with teeth which engage with the internal spline 21 of the stator 14. This plate is prevented from rotating about the hub by means of screws 30 which join it to the non-rotatable locking ring 29. This arrangement thus transfers the circumferential forces produced on the stator by the rotor to the axle 10.

To adjust the play of the bearings 8 and 9, all that is necessary is to remove the screws 30 and to rotate the connecting plate 27, together with the stator 14, so that the plate is made to move toward or away from the bearings by means of the internal thread 26. After the play is adjusted, the screws 30 can be screwed back in place in different holes in the connecting plate. The connecting plate 27 may be provided with a large number of holes spaced close together to permit as fine an adjustment as is necessary.

It will be understood that the above description of the present invention is susceptible to various modifications, changes, and adaptations.

What is claimed is:

1. A motor-driven airplane landing gear wheel arrangement comprising, in combination:
   (a) an axle;
   (b) wheel means incorporating a hub rotatably mounted on said axle, a rim and a generally radially extending felly connecting said hub and said rim;
   (c) motor means incorporating a stator, a rotor and a housing, the latter having an end wall and a circumferential wall, said end wall of said housing being constituted by said felly and said circumferential wall being constituted by a cylindrical portion of said rim, said rotor comprising disc means secured to said wheel means and said stator comprising disc means which are axially spaced from said rotor disc means;
   (d) first securing means interposed between said rotor disc means and said stator disc means for supporting the latter both axially and radially with respect to said rotor disc means, said first securing means being the sole axial and radial support for said stator disc means; and
   (e) second securing means interposed exclusively between said stator disc means and said axle for providing a positive rotational coupling between said stator disc means and said axle.

2. The wheel arrangement defined in claim 1, further comprising wheel brake means arranged substantially within a cylindrical portion of said rim on the side of said felly opposite to the side on which said motor means is arranged.

3. The wheel arrangement defined in claim 2, wherein said stator disc means includes a plurality of grooves and said second securing means includes a connecting disc attached to said axle, said connecting disc having an outer circumference which is provided with teeth which engage in said grooves of said stator disc.

4. The wheel arrangement defined in claim 3, wherein said axle includes an end attached to said landing gear and an unattached free end, and wherein said connecting disc is attached to said free end of said axle.

5. The wheel arrangement defined in claim 4, further comprising at least one wheel bearing, interposed between said hub and said axle, and wherein said connecting plate is arranged as a bearing cap to cover the one of said wheel bearings which is nearest said free end of said axle.

6. The wheel arrangement defined in claim 5, wherein said free end of said axle is hollow and is provided with an internal thread and an external spline, wherein said connecting disc is provided with a portion having an external thread such that said connecting disc may be screwed into said free end of said axle, wherein said second securing means further includes a locking ring arranged around said free end of said axle, said ring having teeth which engage said external spline such that said ring is axially movable with respect to said axle, said ring being detachably coupled to said connecting disc such that its axial position is determined by the axial position of said connecting disc, thereby to permit the adjustment of said wheel bearings.

7. The wheel arrangement defined in claim 2, wherein said rotor disc means includes two rotor discs arranged side by side, and said rotor disc means includes one stator disc arranged between said rotor discs, wherein the magnetically active portion of one of said rotor discs is supported by said felly, and wherein said first securing means includes ball bearing means for supporting said stator disc from said rotor discs.

8. The wheel arrangement defined in claim 7, wherein the other one of said rotor discs is attached to said wheel means such that it can yield in the axial direction.

References Cited

UNITED STATES PATENTS

| 2,273,840 | 2/1942 | Dever. | |
| 2,335,398 | 11/1943 | Downey | 244—103 XR |
| 2,505,770 | 5/1950 | Hill | 244—103 |
| 2,506,146 | 5/1950 | Gladish | 310—67 |

MILTON BUCHLER, Primary Examiner
PAUL E. SAUBERER, Assistant Examiner

U.S. Cl. X.R.
310—67